Sept. 10, 1929.   J. TOMELICK   1,728,141
SCREW DRIVER
Filed July 13, 1928
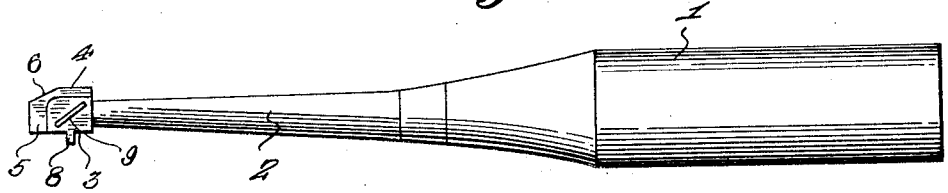
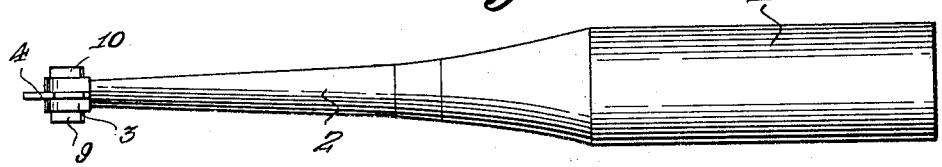
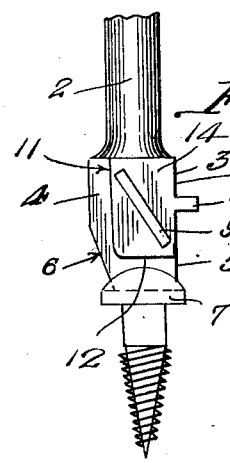 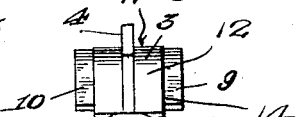 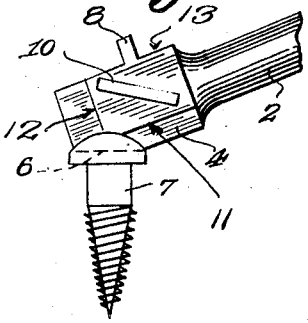
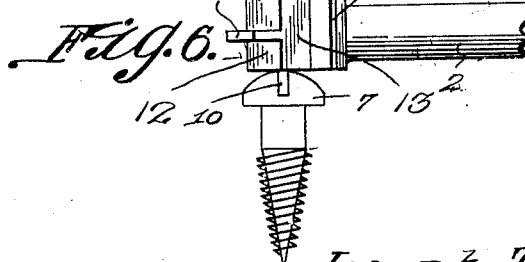
Joseph Tomelick,
INVENTOR Patented Sept. 10, 1929.

1,728,141

UNITED STATES PATENT OFFICE.

JOSEPH TOMELICK, OF FLINT, MICHIGAN.

SCREW DRIVER.

Application filed July 13, 1928. Serial No. 292,537.

The object of this, my present invention, is the provision of a screw driver with a substantially rectangular head on the outer end of the shank thereof, and which head has one of its faces and end integrally formed with longitudinally extending side and end webs which have their corners cut angularly to provide three distinct bits, its second face formed with a rightangle extension that provides an additional bit and its sides formed with oppositely disposed angle webs or extensions that afford additional bits, with the result that the tool may be successfully employed for operation upon the kerfed heads of screws or the like which are arranged in places that are inaccessible to the ordinary type of screw drivers.

To the attainment of the foregoing, the invention consists in the improvement as hereinafter described and definitely claimed.

In the drawings:

Figure 1 is a side elevation of the improvement.

Figure 2 is a top plan view thereof.

Figures 3, 4, 5 and 6 illustrate the various manners in which the tool operates on the kerfed heads of screws or bolts.

My improved screw driver includes the usual handle 1 provided with the shank 2. In the present instance the shank 2 has its outer end formed with an enlargement in the nature of a head 3. The head, while somewhat elongated, is square in cross section. The head 3, on one of its faces 11, is centrally formed with a web extension 4 which extends beyond the end 12 of the said head, as indicated by the numeral 5. The web, from its outer edge, and from the outer edge of its extension 5 is cut angularly, as at 6. The web is of a length and thickness to enter the kerfed head of a screw or bolt 7. On its opposite face 13 the head 3 is formed with an approximately centrally arranged rightangularly disposed web extension 8 that also provides a bit to engage in the kerf of a screw or bolt while the sides 14 of the head 3 are integrally formed with angularly arranged parallel web extensions 9 and 10.

Figures 3, 4, 5 and 6 illustrate some of the manners in which the screw driver may successfully be employed for turning screws or bolts. Figure 3 discloses the bit 5 engaging a screw, and this bit is substantially similar to the bit formed on the shank of an ordinary screw driver. The remaining Figures 4, 5 and 6, however, show the manner in which the tool may be employed for engaging the kerfed heads of screws or bolts when the latter are positioned so that the same are not accessible to the ordinary construction of screw drivers. By arranging the bits 9 and 10 in parallelism on the opposite faces 14 of the head 3, it will be apparent that when the device is employed as disclosed by Figure 6, the bit 10 will be caused to assume an angle of 90° with respect to the former position of the bit 9 after the screw driver has been turned 180° about its axis to utilize bit 10. Thus it will be noted that with my improvement the kerfed head of a screw or bolt, regardless of its arrangement, may be successfully operated upon and the simplicity and advantages of my construction and the advantages thereof will, it is thought, be understood and appreciated without further detailed description.

Having described the invention, I claim:

A screw driver including a bit having its outer end integrally formed with an elongated head which is square in cross section, said head having one of its faces and the end thereof centrally formed with a web extension that has an angle corner, and affords three separate and distinct bits, the opposite face of the head being integrally formed with a transverse bit and the sides of the head being integrally formed with angularly disposed bits which are arranged in parallelism.

In testimony whereof I affix my signature.

JOSEPH TOMELICK.